Figure 1:
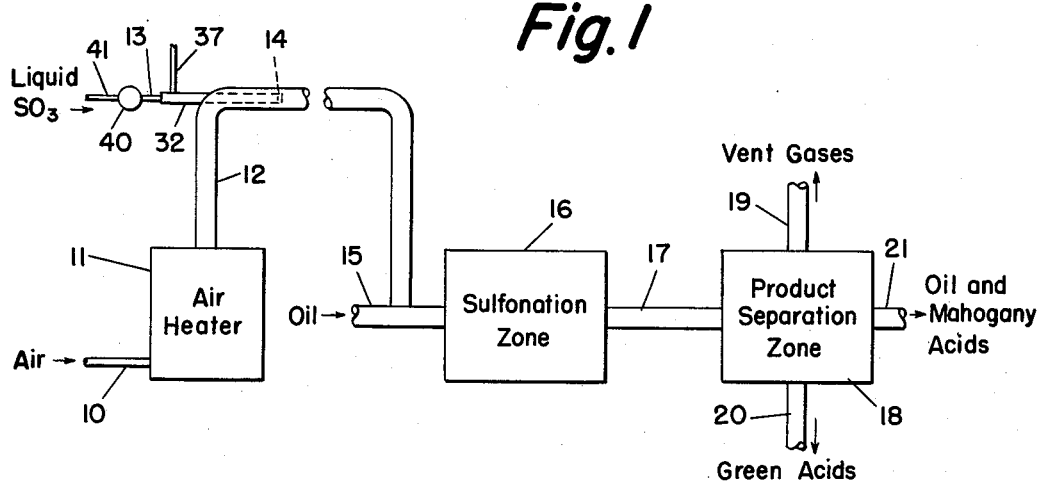

Nov. 1, 1955  F. E. ANDERSON  2,722,543
PREPARATION OF SULFONATING AGENT
Filed Oct. 21, 1952

*INVENTOR.*
FRANK E. ANDERSON
BY
ATTORNEY 2,722,543

PREPARATION OF SULFONATING AGENT

Frank E. Anderson, Springfield, Pa., assignor to Sun Oil Company, Philadelphia, Pa., a corporation of New Jersey Application October 21, 1952, Serial No. 315,996

6 Claims. (Cl. 260—504)

This invention relates to the preparation of a sulfonating agent suitable for use in sulfonation of various materials such as mineral oil.

The sulfonating agent prepared according to the invention is made from liquid sulfur trioxide and comprises a mixture of gaseous sulfur trioxide with an inert carrier gas such as air, nitrogen, etc. The use of such sulfonating agent has important advantages over the use of sulfuric acid or oleum in various sulfonations, e. g. sulfonation of mineral oil to make mahogany sulfonic acids. One such advantage is the minimizing of sludge formation; another is the facilitation of continuous operation as contrasted with the batch operation ordinarily used in sulfuric acid or oleum treating.

Liquid sulfur trioxide has a tendency to polymerize upon standing, and it is necessary to incorporate a stabilizing material in the liquid sulfur trioxide in order to inhibit such polymerization. Stabilizers which are commercially used for such purpose include boron compounds such as boron trioxide ($B_2O_3$); other boron compounds known to have a stabilizing action include sodium tetraborate, boric acid, potassium fluoborate, etc. Various stabilizers other than boron compounds are also known in the art. Either liquid or solid stabilizers may be employed. The amount of stabilizer used is generally in the range 0.03 to 1.5 weight percent.

Previously, sulfonating agents have been prepared from liquid sulfur trioxide by continuously introducing the liquid sulfur trioxide and inert carrier gas, e. g. air, into a heated vaporizing chamber, contacting the carrier gas therein with a body of heated sulfur trioxide, and removing inert carrier gas containing vaporized sulfur trioxide from the vaporizing chamber. Previously, difficult problems have been encountered in such operation, since heavy deposits of dark, tarry material accumulate on the heating surfaces and interfere with heat transfer and the flow of fluids through the vaporizing chamber. Also, in cases where the liquid sulfur trioxide contains a stabilizer, e. g. a boron compound, having boiling point higher than that of the sulfur trioxide, e. g. boron trioxide, sodium tetraborate, boric acid, potassium fluoborate, sodium metaborate, etc., the difficulty is aggravated since the stabilizer is not vaporized and is left as a deposit in the vaporizing chamber, where it also causes difficulty by adhering to the heating surfaces and interfering with heat transfer. The nature of the deposit is not definitely known except that it consists in part of stabilizer when a non-volatile stabilizer is employed. At any rate, the deposit rapidly accumulates and soon becomes so great as to interfere with the flow of fluids through the vaporizing chamber, so that the apparatus must be shut down and cleaned out.

The present invention overcomes these disadvantages and provides a highly effective method for preparing a sulfonating agent from liquid sulfur trioxide. According to the present invention, instead of vaporizing the sulfur trioxide by evolving vapors from a heated body of sulfur trioxide, the sulfur trioxide is vaporized by subjecting a fine spray thereof to contact with an inert carrier gas at a temperature above the temperature of the sulfur trioxide, thereby to vaporize the liquid sulfur trioxide droplets in the fine spray. In this way, any stabilizer in the sulfur trioxide droplets is released into the carrier gas upon vaporization of the sulfur trioxide and can be ultimately disposed of in various suitable ways, as subsequently more fully described. In prior operation, on the other hand, where the sulfur trioxide was vaporized by evolving vapors from a body of heated sulfur trioxide, at least part of any stabilizer released from sulfur trioxide as tne latter vaporized accumulated in the vaporizing chamber and formed deposits on the heating surfaces therein.

The contact of inert carrier gas with sulfur trioxide spray in the method of the invention is suitably obtained by forcing liquid sulfur trioxide through an atomizer or spray nozzle into contact with the carrier gas. The carrier gas is preheated, prior to contact with the spray of liquid sulfur trioxide, to a temperature above the temperature of the sulfur trioxide, and preferably to a temperature of at least 300° F., more preferably at least 500° F. Still higher temperatures can be used if desired e. g. up to 1000° F. or more.

The temperature differential between the carrier gas and sulfur trioxide must be sufficient to vaporize the sulfur trioxide; the temperature necessary for vaporization is generally less than the normal boiling point of the sulfur trioxide, because of the presence of the inert carrier gas, and varies according to the relative rates at which the sulfur trioxide and carrier gas are contacted.

The liquid sulfur trioxide can also be preheated, if desired, before contacting with the heated carrier gas. If the sulfur trioxide is preheated above its normal boiling point, the preheating should be done under pressure sufficient to maintain the sulfur trioxide in liquid phase; otherwise, there would be a disadvantageous tendency for a deposit to accumulate on the heating surfaces. If the sulfur trioxide is preheated above the temperature required for vaporization, the sensible heat in the sulfur trioxide provides part of the heat required for vaporization of the sulfur trioxide upon release of pressure after atomization.

The sulfonating agent prepared as described above comprises a mixture of inert carrier gas and gaseous sulfur trioxide which mixture contains in suspension at least a portion of any stabilizer released from the sulfur trioxide on vaporization. The relative amounts of carrier gas and sulfur trioxide in the mixture depend on the relative rates of supply of carrier gas and sulfur trioxide to the zone where the sulfur trioxide spray is contacted with the stream of carrier gas. Generally, at given temperatures of the carrier gas and sulfur trioxide, and at a given rate of carrier gas supply, there is an upper limit on the rate of sulfur trioxide supply at which complete vaporization can be obtained, and therefore there is an upper limit at such given temperatures on the proportion of gaseous sulfur trioxide in the resulting sulfonating agent. Consequently, higher temperatures of carrier gas and/or sulfur trioxide should generally be used when higher proportions of sulfur trioxide in the sulfonating agent are desired. For example, if 5–10 mole percent of sulfur trioxide in the sulfonating agent is desired, the temperature of the carrier gas upon contact with sulfur trioxide may in some cases suitably be 500° F. or less; whereas if 10–50 mole percent of sulfur trioxide is desired, the temperature of the carrier gas is preferably above 500° F. Generally, if the sulfur trioxide is preheated, the temperature of the carrier gas can be less than would be necessary if the sulfur trioxide were not preheated. In any event, however, the temperature of carrier gas should be substantially above, say at least 10° F. above, the temperature required for vaporization of the sulfur trioxide.

According to the present invention, the rates and temperatures of the sulfur trioxide and carrier gas are so chosen as to provide complete or substantially complete vaporization of the sulfur trioxide. The vaporization need not occur immediately upon contact of the sulfur trioxide with the heated carrier gas, and the carrier gas may be transported for a substantial distance with liquid sulfur trioxide droplets in suspension, but the droplets should be ultimately vaporized, and should in any event be vaporized prior to introduction into contact with a sulfonation charge stock, since liquid sulfur trioxide has an adverse effect on the sulfonation process in that it tends to produce disadvantageously large amounts of green sulfonic acids, rather than the more valuable mahogany acids. In the light of the present specification, a person skilled in the art can select the proper rates and temperatures of sulfur trioxide and carrier gas in order to obtain complete or substantially complete vaporization.

Any suitable means of obtaining a fine spray of liquid sulfur trioxide can be employed according to the invention. At ordinary temperatures, the viscosity of liquid sulfur trioxide is of the same general order of magnitude as the viscosity of water, and spray nozzles or atomizers capable of providing fine sprays of water are generally suitable for providing a fine spray of liquid sulfur trioxide for the purposes of the present invention. Generally, it is preferred that the droplets in the spray should be quite small, e. g. having sizes of the same order of magnitude as the sizes of droplets in a fog or mist. The preheating, if any, of the sulfur trioxide prior to atomizing may have particular advantage in decreasing the viscosity of the sulfur trioxide and thereby making it easier to disperse into a fine spray.

Certain precautions are preferably taken to avoid any tendency for the spray nozzle or other apparatus to become plugged with solid sulfur trioxide. Since sulfur trioxide melts at about 62° F., care should be taken that the temperature in the sulfur trioxide handling apparatus should be substantially above 62° F., e. g. at least 80° F. Electrically heated conduits may advantageously be used to convey the sulfur trioxide.

A further advisable precaution to avoid possible plugging of the spray nozzle is to strain the liquid sulfur trioxide before introduction into the spray nozzle, the purpose of such straining being to remove any solid sulfur trioxide polymer in the liquid sulfur trioxide and/or any relatively large agglomerates of solid, undissolved stabilizer in the liquid sulfur trioxide. Any suitable type of strainer can be employed such as the well known "steam strainer." Strainers comprising screens within the range from 40 to 100 mesh, through which screen the liquid sulfur trioxide passes, are generally suitable. The use of a strainer is preferred, but not essential according to the invention.

Although spray nozzles generally are suitable for use according to the invention, it has been found that a particularly suitable type of nozzle is that which is adapted to discharge the liquid sulfur trioxide through an orifice having cross sectional area within the approximate range 0.01 to 0.02 square inch, and which is adapted to discharge an atomizing gas such as air into contact with the sulfur trioxide shortly after the latter is discharged through the orifice. Such nozzles are particularly advantageous for use according to the present invention, since under optimum operating conditions, they provide a spray containing a large number of fine droplets offering a large heat transfer area, and since they are not subject to excessive danger of plugging and stoppage. The area of the orifice is preferably not less than 0.01 square inch, since smaller areas may result in excessive danger of plugging and stoppage. The area of the orifice is preferably not greater than 0.02 square inch, since larger areas tend to result in fewer and larger droplets in the spray produced. The use of atomizing gas is also preferred, since fewer and larger droplets are produced when the atomizing gas is not used.

Optimum operating conditions for the spray nozzle generally include pressure drops of liquid sulfur trioxide across the nozzle within the range 20 to 100 pounds per square inch, and a spray angle within the range 80 to 120 degrees. By spray angle is meant the included angle of the vertex of the conical spray; this angle can be determined approximately by visual observation of the spray in operation. Smaller spray angles than 80 degrees are preferably not employed since they tend to result in coalescence of the droplets in the spray. Greater spray angles than 120 degrees are preferably not employed where the spray is discharged into a conduit having relatively restricted cross section, since they tend to result in impingement of the spray on the inner conduit wall.

Although the above-described type of spray nozzles and optimum operating conditions are particularly advantageous it is to be understood that other types of spray nozzle can be used, and that the above-described optimum conditions do not necessarily apply to other types of spray nozzle.

The sulfonating agent prepared according to the invention is highly suitable for use in sulfonation of mineral oil, by contacting the sulfonating agent with mineral oil under sulfonating conditions. The sulfonation can be performed under a variety of conditions as known for sulfonation of mineral oil with gaseous sulfonating agents comprising sulfur trioxide, and can be performed in the presence of any stabilizer which has been released from the sulfur trioxide during the vaporization thereof and incorporated in the sulfonating agent. It has been found that the presence of the stabilizer, e. g. a boron compound, does not affect the sulfonation adversely in any way, nor impair the quality or usefulness of any sulfonation product. In the sulfonation of mineral lubricating oil to make mahogany or oil-soluble sulfonic acids, the sulfonating agent containing boron trioxide, it has been found that the oil phase of the sulfonation product, which phase contains the dissolved mahogany acid product, is substantially free from the boron compound. Therefore, although it is within the scope of the invention to remove the stabilizer from the sulfonating agent by suitable known means for separation of liquids or solids from suspension in gases, no such separation need be effected and any stabilizer in the sulfonating agent may be advantageously introduced into the sulfonation zone.

Figure 2:
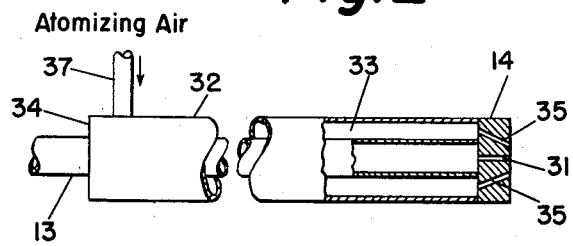
Figure 3:
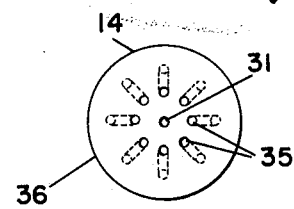

The process of the invention will be further described with reference to the attached drawing. Figure 1 is a schematic flow sheet of a process involving contacting a stream of preheated, inert carrier gas with a fine spray of liquid sulfur trioxide containing a boron compound as stabilizer, and employing the resulting sulfonating agent in a subsequent sulfonation of oil. Figures 2 and 3 illustrate a type of spray nozzle which can be used with particular advantage to obtain the fine spray of liquid sulfur trioxide.

Referring now to Figure 1: Air is introduced through line 10 into air heater 11. The latter may be of any suitable known construction. The heater 11 may be, for example, a steam-coil heater, or if the temperatures required are too high to be obtained with a steam heater, the heater 11 may be a gas-fired heater. For the purpose of the present description, it will be assumed that a gas-fired heater is used, and that the air is heated therein to a temperature of about 600° F. The heated air then passes into and through line 12 at a rate of about 30,000 cubic feet (standard conditions) per hour.

Liquid sulfur trioxide, containing, e. g. 0.2 weight percent boron trioxide as stabilizer, of which about 0.1 weight percent is dissolved in the sulfur trioxide, the other 0.1 percent being suspended as a solid therein, is introduced through conduit 41 into strainer 40 and passes through a screen therein, e. g. a 60 mesh screen, in order to filter out any solid polymers, or stabilizer aggregates too large to pass through the screen. The liquid sulfur trioxide, after such straining, passes through conduit 13 into atomizer 14, positioned within conduit 12 and coaxial therewith. The conduit 13 and a surrounding sleeve 32 pass through the wall of conduit 12 and terminate in atomizer 14 as more fully described in connection with Figures 2 and 3. The rate of introduction of sulfur trioxide through conduit 13 is about 1000 pounds per hour, and the temperature of the liquid sulfur trioxide is about 96° F. The liquid sulfur trioxide is sprayed from atomizer 14 into the current of heated air passing through conduit 12. As the fine droplets of sulfur trioxide contact the hot air, they are rapidly vaporized. The boron trioxide in the droplets becomes suspended in the solid state in the stream of carrier gas, and is carried along through line 12. The sulfonating agent which results from the spraying of the liquid sulfur trioxide with the heated air comprises a mixture of gaseous sulfur trioxide and air containing about 13.5 mole percent of sulfur trioxide, and also containing in suspension the solid boron trioxide released from the liquid sulfur trioxide upon vaporization of the latter. This sulfonating agent is introduced from line 12 into line 15 through which a sulfonation charge stock, e. g. solvent-refined mineral lubricating oil, is passed into sulfonation zone 16.

Upon introduction into line 15, the sulfonating agent comprising air and gaseous sulfur trioxide, has a temperature very substantially lower than that of the air prior to contacting with liquid sulfur trioxide spray, since a large amount of heat has been abstracted from the air to vaporize the sulfur trioxide. For example, the temperature of the sulfonating agent upon introduction into line 15 may be about 200° F.

Upon contact of the sulfonating agent with the charge oil, the sulfur trioxide in the sulfonating agent reacts with constituents of the mineral oil to form, for example, mahogany or oil-soluble sulfonic acids and green or oil-insoluble sulfonic acids. The sulfonation products, which contain the boron trioxide which was introduced into sulfonation zone 16 through line 15, pass to product separation zone 18 through line 17. Vent gases are removed from zone 18 through line 19. The green acids in the liquid sulfonation products are allowed to settle out and are removed through line 20. The supernatant oil containing dissolved mahogany acids is withdrawn through line 21 and may if desired be further treated according to known procedures. The boron trioxide introduced into the zone 18 is mainly removed therefrom together with the green acids, though small amounts may be removed with the vent gases. Generally, the supernatant oil will be substantially free from boron trioxide. In no case does the presence of the boron trioxide in any of the sulfonation products impair their value or suitability for various known uses.

Referring now to Figures 2 and 3 for a fuller description of atomizer 14, in which conduit 13 terminates: Atomizer 14 has a central orifice 31 whose cross sectional area is about 0.0145 square inches. Surrounding a portion of conduit 13 is a sleeve 32 which provides with conduit 13 an annular passage 33 for atomizing air, which passage is closed at one end by a plate 34 and communicates at the other end with several passages 35 in atomizer 14.

In operation, liquid sulfur trioxide containing a boron compound as inhibitor is forced at about 80 p. s. i. g. through conduit 13 into and through orifice 31 and passes therefrom into the interior of conduit 12. Atomizing air is forced at about 70 p. s. i. g. through line 37 into annular passage 33 and from there into and through the passages 35. Upon discharge from the passages 35 the atomizing air impinges upon the liquid sulfur trioxide and disperses it into a spray of fine droplets. These droplets contact the heated air which is passing through conduit 12 at about 35 p. s. i. g. and are vaporized thereby and become dispersed therein in the manner described in connection with Figure 1. The atomizing air, whose volume rate of flow is quite small compared with that of the heated air, commingles with the latter after discharge into conduit 12 and passes along therewith through conduit 12. The atomizing air can be, but is not necessarily preheated.

The diameter of the conduit 12 may be, for example, about 6 inches, and the diameter of the atomizer 14 about 2 inches. In some instances, it may be desired to provide a relatively larger conduit in order to minimize the tendency for the atomized liquid sulfur trioxide to strike the conduit wall. However, this is not necessary since the passage of carrier gas around the atomizer and along the conduit wall tends to prevent the impingement of liquid sulfur trioxide on the conduit wall.

The invention claimed is:

1. Method for preparing a sulfonating agent from liquid sulfur trioxide which comprises: atomizing such sulfur trioxide; and contacting the atomized sulfur trioxide with an inert carrier gas preheated to a temperature above the temperature of the sulfur trioxide, thereby to vaporize the sulfur trioxide and form a mixture of gaseous sulfur trioxide with said carrier gas.

2. Method according to claim 1 wherein said liquid sulfur trioxide contains a boron compound as stabilizer.

3. Method according to claim 1 wherein the sulfur trioxide is preheated before atomizing.

4. Method according to claim 1 wherein said carrier gas is preheated to a temperature of at least 300° F.

5. Method according to claim 1 wherein said mixture contains 5–50 percent sulfur trioxide.

6. Method for sulfonating mineral oil by means of a sulfonating agent prepared from liquid sulfur trioxide containing as stabilizer a boron compound having boiling point higher than that of the sulfur trioxide, which comprises: atomizing such sulfur trioxide; contacting the atomized sulfur trioxide with an inert carrier gas preheated to a temperature above the boiling point of the sulfur trioxide, thereby to vaporize the sulfur trioxide and form a mixture of gaseous sulfur trioxide with said carrier gas, said mixture containing the stabilizer in suspension; and contacting said mixture containing said stabilizer with mineral oil under sulfonation conditions.

References Cited in the file of this patent

UNITED STATES PATENTS

| | | |
|---|---|---|
| 1,901,416 | Schroeder | Mar. 14, 1933 |
| 2,458,718 | McCann | Jan. 11, 1949 |
| 2,514,733 | Vold et al. | July 11, 1950 |
| 2,523,582 | Mattson | Sept. 26, 1950 |